US012762267B2

(12) United States Patent
Madhur et al.

(10) Patent No.: US 12,762,267 B2
(45) Date of Patent: *Oct. 13, 2026

(54) PROVIDING SERVICE TIER INFORMATION WHEN VALIDATING API REQUESTS

(71) Applicant: NUTANIX, INC., San Jose, CA (US)

(72) Inventors: Amitesh Madhur, Fremont, CA (US); Manoj Thirutheri, San Jose, CA (US); Divya Venkatachalam, San Jose, CA (US); Ashwani Pandey, Delhi (IN); Sreejith Othayedath, Katy, TX (US); Shubham Kumar, San Jose, CA (US); Rajat Kumar Agrawal, Raigarh (IN); Nagashree Praveen Raj, Bangalore (IN)

(73) Assignee: NUTANIX, INC., San Jose, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 19/037,868

(22) Filed: Jan. 27, 2025

(65) Prior Publication Data

US 2025/0173452 A1 May 29, 2025

Related U.S. Application Data

(63) Continuation of application No. 17/931,511, filed on Sep. 12, 2022, now Pat. No. 12,242,628.

(30) Foreign Application Priority Data

Jul. 9, 2022 (IN) ............................ 202241039541

(51) Int. Cl.

| | |
|---|---|
| ***G06F 21/00*** | (2013.01) |
| ***G06F 9/54*** | (2006.01) |
| ***G06F 21/62*** | (2013.01) |

(52) U.S. Cl.

CPC .......... *G06F 21/6218* (2013.01); *G06F 9/547* (2013.01)

(58) Field of Classification Search

None

See application file for complete search history.

(56) References Cited

U.S. PATENT DOCUMENTS

| | | | |
|---|---|---|---|
| 8,458,051 | B1 | 6/2013 | Saltzman et al. |
| 8,549,518 | B1 | 10/2013 | Aron et al. |

(Continued)

FOREIGN PATENT DOCUMENTS

| | | | | |
|---|---|---|---|---|
| CN | 100596070 C | * | 3/2010 | |
| CN | 108449417 A | * | 8/2018 | ............. H04L 67/60 |

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown); pp. all.

(Continued)

*Primary Examiner* — Andrew J Steinle

(74) *Attorney, Agent, or Firm* — Artegis Law Group, LLP

(57) ABSTRACT

In various embodiments, one or more non-transitory computer-readable media storing program instructions that, when executed by one or more processors of an application programming interface (API) server, cause the one or more processors to perform a method comprising receiving, from a client device, a request to access a service; transmitting, to a validation server, an authorization request including an API authorization identifier; receiving, from the validation server, a validation response to the authorization request, the validation response including a validation result based on the API authorization identifier and an indicator of a level of resources to be used when performing the request; and (Continued)

performing the service based on the request and the validation response.

27 Claims, 7 Drawing Sheets

(56) References Cited

U.S. PATENT DOCUMENTS

| | | | |
|---|---|---|---|
| 8,601,473 | B1 | 12/2013 | Aron et al. |
| 8,850,130 | B1 | 9/2014 | Aron et al. |
| 8,863,124 | B1 | 10/2014 | Aron |
| 9,009,106 | B1 | 4/2015 | Aron et al. |
| 9,069,708 | B2 | 6/2015 | Gill et al. |
| 9,336,132 | B1 | 5/2016 | Aron et al. |
| 9,652,265 | B1 | 5/2017 | Narayanasamy et al. |
| 9,747,287 | B1 | 8/2017 | Bhardwaj et al. |
| 9,772,866 | B1 | 9/2017 | Aron et al. |
| 10,080,048 | B2 | 9/2018 | Phatak |
| 11,388,164 | B2 | 7/2022 | Joyce et al. |
| 2014/0007198 | A1 | 1/2014 | Durbha et al. |
| 2019/0303586 | A1* | 10/2019 | Mahaffey .............. H04W 12/12 |
| 2021/0037018 | A1 | 2/2021 | Joyce et al. |
| 2021/0281555 | A1* | 9/2021 | He ...................... H04L 63/0807 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown); pp. all.
Poitras, Steven. "The Nutanix Bible" (Jun. 20, 2014), from http://stevenpoitras.com/the-nutanix-bible/ (Publication date based on indicated capture date by Archive.org; first publication date unknown); pp. all.
Poitras, Steven. "The Nutanix Bible" (Jan. 7, 2015), from http://stevenpoitras.com/the-nutanix-bible/ (Publication date based on indicated capture date by Archive.org; first publication date unknown); pp. all.
Poitras, Steven. "The Nutanix Bible" (Jun. 9, 2015), from http://stevenpoitras.com/the-nutanix-bible/ (Publication date based on indicated capture date by Archive.org; first publication date unknown); pp. all.
Poitras, Steven. "The Nutanix Bible" (Sep. 4, 2015), from https://nutanixbible.com/; pp. all.
Poitras, Steven. "The Nutanix Bible" (Jan. 12, 2016), from https://nutanixbible.com/ ; pp. all.
Poitras, Steven. "The Nutanix Bible" (Jun. 9, 2016), from https://nutanixbible.com/; pp. all.
Poitras, Steven. "The Nutanix Bible" (Jan. 3, 2017), from https://nutanixbible.com/; pp. all.
Poitras, Steven. "The Nutanix Bible" (Jun. 8, 2017), from https://nutanixbible.com/; pp. all.
Poitras, Steven. "The Nutanix Bible" (Jan. 3, 2018), from https://nutanixbible.com/; pp. all.
Poitras, Steven. "The Nutanix Bible" (Jun. 25, 2018), from https://nutanixbible.com/; pp. all.
Poitras, Steven. "The Nutanix Bible" (Jan. 8, 2019), from https://nutanixbible.com/; pp. all.
Poitras, Steven. "The Nutanix Bible" (Jul. 25, 2019), from https://nutanixbible.com/; pp. all.
Poitras, Steven. "The Nutanix Bible" (Sep. 17, 2019), from https://nutanixbible.com/; pp. all.
Cano, Ignacio et al. "Curator: Self-Managing Storage for Enterprise Clusters"; University of Washington; published Mar. 2017; pp. all.
Poitras, Steven. "The Nutanix Bible" (Mar. 2, 2020), from https://nutanixbible.com/; pp. all.
Poitras, Steven. "The Nutanix Bible" (Sep. 1, 2020), from https://nutanixbible.com/; pp. all.
Brinckwirth, John, "Examples for Using API Policy Manager", Nov. 20, 2021, 3 pages.
API Management policies to validate requests and responses, https://doc,s.microsoft.com/en-us/azure/apinanagement/validation-policies, Jul. 14, 2022, 3 pages.
Protect serverless APIs with Azure API Management and Azure AD B2C for consumption from a SPA, https://docs.nicrosoft.com/en-us/azure/api-management/howto-protect-backend-frontend-azure-ad-b2c, Jul. 6, 2022, 18 pages.
What is Azure Cognitive Search?, https://docs.microsoft. om/en-us/azure/search/search-what-is-azure-search, Jul. 23, 2022, 2 pages.
Service limits in Azure Cognitive Search, https://doc,s.microsoft.com/en-us/azure/search/search-limits-quotas- capacity, Jun. 12, 2022, 6 pages.
Set up basic request validation in API Gateway https://docs.aws.amazon. com/apigateway/latest/developerguide/apigateway-request-validation-set-up.html, Sep. 12, 2022, 9 pages.
Creating API requests and handling responses, https://cloud.google.com/compute/doc,s/api/how-tos/api-requests-responses, Sep. 12, 2022, 8 pages.
Access and authentication for the REST API, https://doc,s.bmc.com/doc,s/ars2002/access-and-authentication-for-the-rest-api-915370111.html, Sep. 12, 2022, 2 pages.

* cited by examiner

PROVIDING SERVICE TIER INFORMATION WHEN VALIDATING API REQUESTS

RELATED APPLICATIONS

This application is a continuation of the co-pending U.S. patent application titled, "PROVIDING SERVICE TIER INFORMATION WHEN VALIDATING API REQUESTS", filed on Sep. 12, 2022, and having Ser. No. 17/931,511, which claims the benefit to India Provisional Application No. 202241039541, filed Jul. 9, 2022, and entitled "PROVIDING SERVICE TIER INFORMATION WHEN VALIDATING API REQUESTS,". The subject matter of these related applications is hereby incorporated herein by reference.

BACKGROUND

Field of the Various Embodiments

Embodiments of the present invention relate generally to computing services, and, more specifically, to providing service tier information when validating API requests.

Description of the Related Art

Servers often provide application programming interfaces (APIs) that fulfill requests involving one or more services. For example, when a user of a client device requests an operation involving the service, the client device sends a request that is formatted according to the API. The server receives the request and validates the contents, such as verifying that the request meets the formatting requirements of the API. Services provided through APIs may also feature different service tiers, such as a free tier and one or more paid tiers, also referred to as subscription tiers.

One drawback of such techniques is the difficulty of determining how to respond to a particular API request in view of the different levels of service offered through an API. Another drawback of such techniques is the involvement of the client device in using a particular service tier of a service.

As the foregoing indicates, what is needed are more effective techniques for validating API requests.

SUMMARY

In various embodiments, one or more non-transitory computer-readable media store program instructions that, when executed by one or more processors, cause the one or more processors to perform a method comprising receiving, from an API server, a request to access a service, the request including an API authorization identifier; validating the API authorization identifier to generate a validation result; determining a service tier of the service based on the request; and transmitting, to the API server, a response including the validation result and an indicator of the service tier based on the request.

In various embodiments, one or more non-transitory computer-readable media store program instructions that, when executed by one or more processors, cause the one or more processors to perform a method comprising receiving, from a client device, a request to access a service; transmitting, to a validation server, an API request including an API authorization identifier; receiving, from the validation server, an API validation response, the API validation response including a validation result based on the API authorization identifier and an indicator of a service tier of the service based on the request; and performing the service based on the API request and the API validation response.

Further embodiments provide, among other things, methods and systems for implementing one or more aspects of the disclosed techniques.

At least one technical advantage of the disclosed techniques relative to the prior art is that, with the disclosed techniques, an API server is able to better manage computing resources for responding to API requests by taking into account the service tiers associated with each of the API requests. Another technical advantage is that, with the disclosed techniques, there is increased efficiency in determining the service tier to provide a response to an API request by reducing the time and computing resources used to determine the service tier. The increased efficiency therefore improves the scalability of the API server to handle a higher volume of API requests and the speed with which the API server responds to an API request. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, can be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1A:
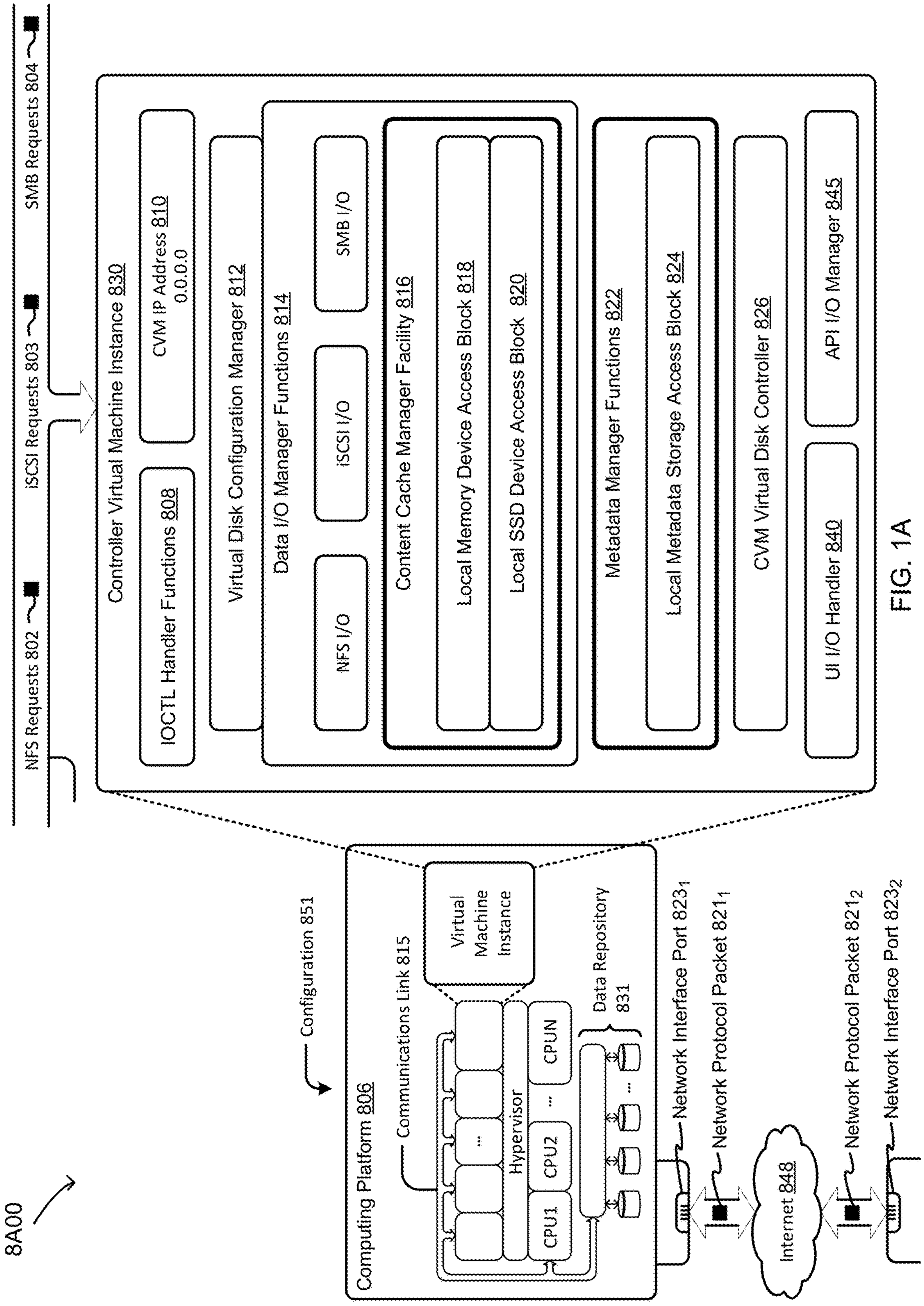
FIGS. 1A-1D are block diagrams illustrating virtualization system architectures configured to implement one or more aspects of the present embodiments.

As described herein, servers often provide application programming interfaces (APIs) that fulfill requests involving one or more services. In some cases, the API server sends the request to a validation server to determine whether the user and client device are permitted to use the service. The validation server compares the request with internal records to verify the identity of the user and/or client device requesting the service and/or to validate an authorization identifier (e.g., a key, token, certificate, and/or the like) associated with the user, the client device, and/or the request. The authorization identifier can be used to verify authorization of the user, client device, and/or request (e.g., to establish that the user, client device, and/or request are permitted to access the service). The authorization identifier can also be used to authenticate the user, client device, and/or request. Based on this analysis, the validation server informs the API server as to whether or not the user and/or client device are permitted to use the service. If the validation server validates the request (e.g., indicating that the user and client device are permitted to use the service), then the API server performs the requested operation and transmits a response to the client device indicating a result of the operation. If the validation server does not validate the request (e.g., indicating that one or both of the user or client device are not permitted to use the service), then the API server transmits a response to the client device indicating a refusal to perform the operation.

Services provided through APIs can also feature different service tiers, such as a free tier and one or more subscription tiers. For example, an API server may provide a free tier of a service that is limited in terms of a range of available operations, a level of detail of information provided by the API, and/or a resource limit of resources that can be expended by the API (e.g., a low usage quota or a small number of search results). The API server can also provide a subscription tier of the service that includes a more extensive range of available operations than the free tier of the service, that generates more information at a higher level of detail than the free tier of the service and/or that features a higher resource limit than the free tier of the service (e.g., a high usage quota or a large number of search results). In some cases, an API server may offer different tiers of a service for different types of subscriptions, each tier including a different set of operations and/or different kinds of information.

As described herein, one drawback of conventional techniques is the difficulty of determining how to respond to a particular API request in view of the different levels of service offered through an API. For example, an API server can store subscription information for various users. Upon receiving an API request, the API server first validates the API request by communicating with the validation server. If the validation server validates the API request, then the API server reviews stored information to determine a service tier for the API request, and responds to the API request according to the determined service tier. However, this configuration requires the API server to perform a separate determination of the service tier after receiving the validation result from the validation server, which can decrease efficiency and increase delay in responding to an API request. Further, this configuration isolates the subscription information for a service to the API server that stores the API for the service. If the service tier of the API is associated with a subscription of a user and/or client device to a plurality of services, then the subscription information is distributed and coordinated among a plurality of servers that provide the plurality of services. Discrepancies in this coordination can cause a first API server to provide a first service according to a first service tier, while a second API server provides a second service according to a second, different service tier. These differences can result in the subscription of a user and/or client device resulting in different service tiers by different services.

Further, another drawback of such conventional techniques is the involvement of the client device in using a particular service tier of a service. For example, an API server can offer the free service through a first endpoint (e.g., a first uniform resource locator or URL) and one or more subscription services through a second endpoint (e.g., a second URL). The API server responds to requests through the first endpoint based on a free service tier and responds to requests through the second endpoint based on a subscription service tier. However, configuring a service with different endpoints for different service tiers requires the client device to use the URL that corresponds to a particular service tier. As a result, the client device must be informed as to the URLs associated with different service tiers and which service tier the user and/or client device is authorized to use. The client device must also be informed if the service tier of the API changes (e.g., if the user establishes a subscription with the service, or if a subscription with the service expires). Configuring the client device to receive and process this information and to adapt corresponding functionality accordingly complicates the implementation of the service on the client device. As another example, the client device can use one of several versions of a client-side API, where a first version of the client-side API accesses a free version of the API service and a second version of the client-side API accesses a subscription version of the API. However, if the service tier of the API changes, the client device must retrieve, install, and use a different version of the client-side API that corresponds to the updated service tier.

In the following description, various concepts and examples are disclosed that provide more effective techniques for validating API requests. The numerous specific details set forth will provide artisans with a more thorough understanding of the various embodiments. However, it will be apparent to one of skilled in the art that the inventive concepts can be practiced without one or more of these specific details.

Exemplary Virtualization System Architectures

According to some embodiments, all or portions of any of the foregoing techniques can be partitioned into one or more modules and instances within, or as, or in conjunction with a virtualized controller in a virtual computing environment. Some example instances within various virtual computing environments are shown and discussed in further detail in FIGS. 1A-1D. Consistent with these embodiments, a virtualized controller includes a collection of software instructions that serve to abstract details of underlying hardware or software components from one or more higher-level processing entities. In some embodiments, a virtualized controller can be implemented as a virtual machine, as an executable container, or within a layer (e.g., such as a layer in a hypervisor). Consistent with these embodiments, distributed systems include collections of interconnected components that are designed for, or dedicated to, storage operations as well as being designed for, or dedicated to, computing and/or networking operations.

In some embodiments, interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

In some embodiments, a hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

In some embodiments, physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

FIG. 1A is a block diagram illustrating virtualization system architecture 8A00 configured to implement one or more aspects of the present embodiments. As shown in FIG. 1A, virtualization system architecture 8A00 includes a collection of interconnected components, including a controller virtual machine (CVM) instance 830 in a configuration 851. Configuration 851 includes a computing platform 806 that supports virtual machine instances that are deployed as user virtual machines, or controller virtual machines or both. Such virtual machines interface with a hypervisor (as shown). In some examples, virtual machines may include processing of storage I/O (input/output or IO) as received from any or every source within the computing platform. An example implementation of such a virtual machine that processes storage I/O is depicted as CVM instance 830.

In this and other configurations, a CVM instance receives block I/O storage requests as network file system (NFS) requests in the form of NFS requests 802, internet small computer storage interface (ISCSI) block IO requests in the form of iSCSI requests 803, Samba file system (SMB) requests in the form of SMB requests 804, and/or the like. The CVM instance publishes and responds to an internet protocol (IP) address (e.g., CVM IP address 810). Various forms of input and output can be handled by one or more IO control handler functions (e.g., IOCTL handler functions 808) that interface to other functions such as data IO manager functions 814 and/or metadata manager functions 822. As shown, the data IO manager functions can include communication with virtual disk configuration manager 812 and/or can include direct or indirect communication with any of various block IO functions (e.g., NFS IO, ISCSI IO, SMB IO, etc.).

In addition to block IO functions, configuration 851 supports IO of any form (e.g., block IO, streaming IO, packet-based IO, HTTP traffic, etc.) through either or both of a user interface (UI) handler such as UI IO handler 840 and/or through any of a range of application programming interfaces (APIs), possibly through API IO manager 845.

Communications link 815 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), formatting of bit fields into fixed-length blocks or into variable length fields used to populate the payload, and/or the like. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

Computing platform 806 includes one or more computer readable media that is capable of providing instructions to a data processor for execution. In some examples, each of the computer readable media may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random-access persistent memories (RAPMs) or optical or magnetic media drives such as paper tape or magnetic tape drives. Volatile media includes dynamic memory such as random-access memory (RAM). As shown, controller virtual machine instance 830 includes content cache manager facility 816 that accesses storage locations, possibly including local dynamic random-access memory (DRAM) (e.g., through local memory device access block 818) and/or possibly including accesses to local solid-state storage (e.g., through local SSD device access block 820).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 831, which in turn can be formatted into any one or more storage areas, and which can comprise parameterized storage accessible by a key (e.g., a filename, a table name, a block address, an offset address, etc.). Data repository 831 can store any forms of data and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 824. The data repository 831 can be configured using CVM virtual disk controller 826, which can in turn manage any number or any configuration of virtual disks.

Execution of a sequence of instructions to practice certain of the disclosed embodiments is performed by one or more instances of a software instruction processor, or a processing element such as a data processor, or such as a central processing unit (e.g., $CPU_1$, $CPU_2$, . . . , $CPU_N$). According to certain embodiments of the disclosure, two or more instances of configuration 851 can be coupled by communications link 815 (e.g., backplane, LAN, PSTN, wired or wireless network, etc.) and each instance may perform respective portions of sequences of instructions as may be required to practice embodiments of the disclosure.

The shown computing platform 806 is interconnected to the Internet 848 through one or more network interface ports (e.g., network interface port $\mathbf{823}_1$ and network interface port $\mathbf{823}_2$). Configuration 851 can be addressed through one or more network interface ports using an IP address. Any operational element within computing platform 806 can perform sending and receiving operations using any of a range of network protocols, possibly including network protocols that send and receive packets (e.g., network protocol packet $\mathbf{821}_1$ and network protocol packet $\mathbf{821}_2$).

Computing platform 806 may transmit and receive messages that can be composed of configuration data and/or any other forms of data and/or instructions organized into a data structure (e.g., communications packets). In some cases, the data structure includes program instructions (e.g., application code) communicated through the Internet 848 and/or through any one or more instances of communications link 815. Received program instructions may be processed and/or executed by a CPU as it is received and/or program instructions may be stored in any volatile or non-volatile storage for later execution. Program instructions can be transmitted via an upload (e.g., an upload from an access device over the Internet 848 to computing platform 806). Further, program instructions and/or the results of executing program instructions can be delivered to a particular user via a download (e.g., a download from computing platform 806 over the Internet 848 to an access device).

Configuration 851 is merely one example configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

In some embodiments, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to management of block stores. Various implementations of the data repository comprise storage media organized to hold a series of records and/or data structures.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT," issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT," issued on Oct. 1, 2013, which is hereby incorporated by reference in its entirety.

Figure 1B:
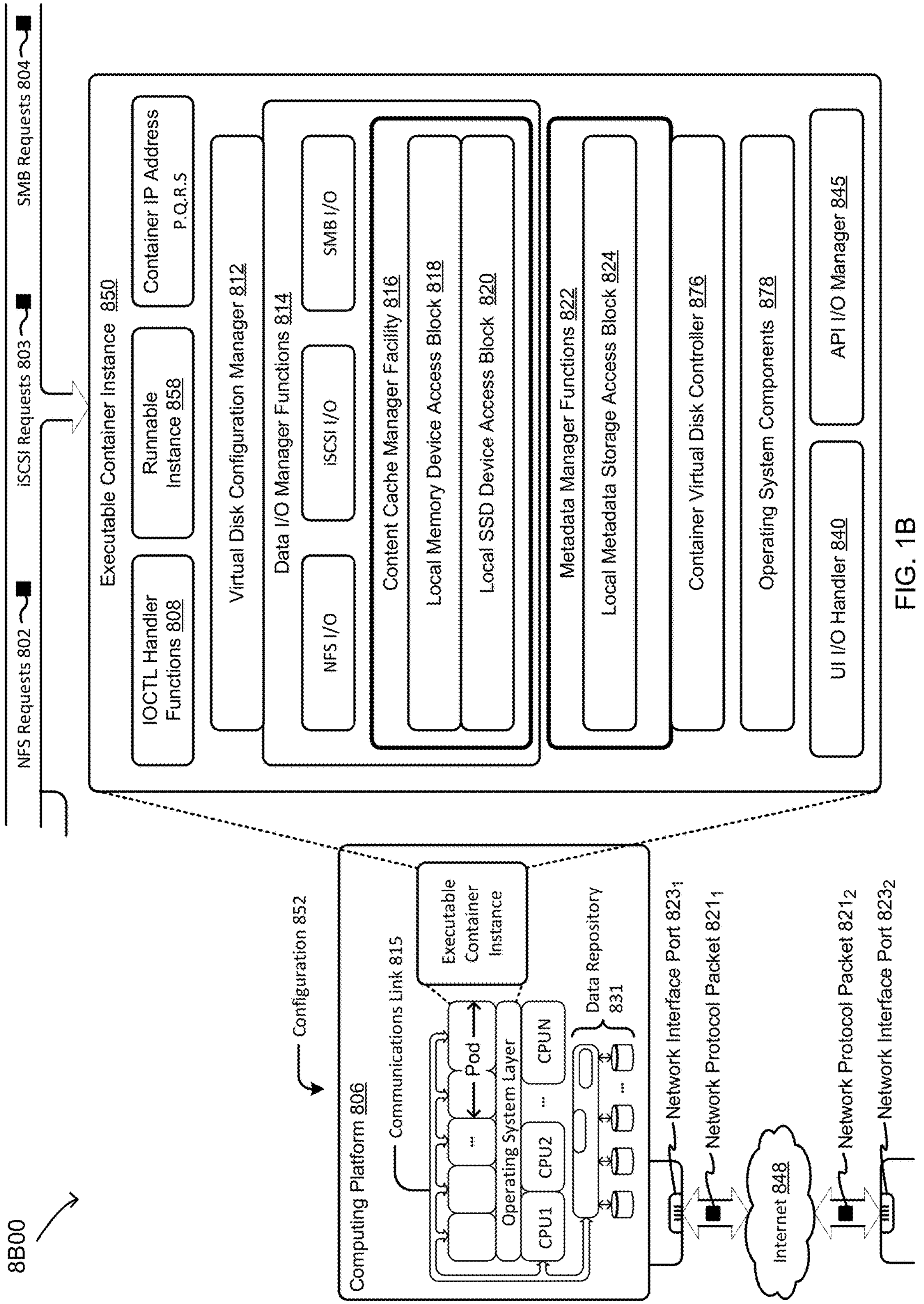

FIG. 1B depicts a block diagram illustrating another virtualization system architecture 8B00 configured to implement one or more aspects of the present embodiments. As shown in FIG. 1B, virtualization system architecture 8B00 includes a collection of interconnected components, including an executable container instance 850 in a configuration 852. Configuration 852 includes a computing platform 806 that supports an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In some embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 850). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "Is" or "Is-a", etc.). The executable container might optionally include operating system components 878, however such a separate set of operating system components need not be provided. As an alternative, an executable container can include runnable instance 858, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 876. Such a container virtual disk controller can perform any of the functions that the aforementioned CVM virtual disk controller 826 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 1C:
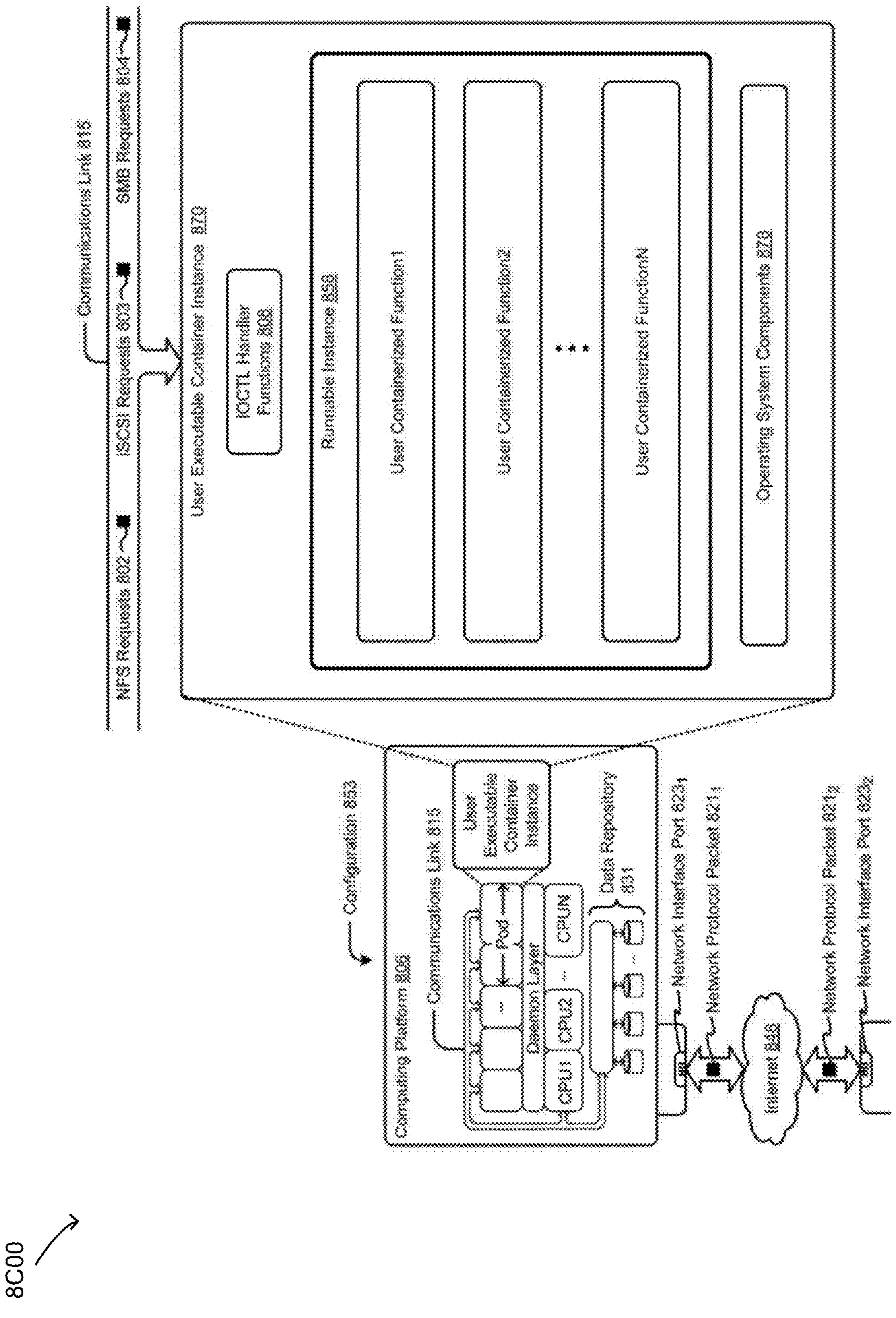

FIG. 1C is a block diagram illustrating virtualization system architecture 8C00 configured to implement one or more aspects of the present embodiments. As shown in FIG. 1C, virtualization system architecture 8C00 includes a collection of interconnected components, including a user executable container instance in configuration 853 that is further described as pertaining to user executable container instance 870. Configuration 853 includes a daemon layer (as shown) that performs certain functions of an operating system.

User executable container instance 870 comprises any number of user containerized functions (e.g., user containerized function$_1$, user containerized function$_2$, . . . , user containerized function$_N$). Such user containerized functions can execute autonomously or can be interfaced with or wrapped in a runnable object to create a runnable instance (e.g., runnable instance 858). In some cases, the shown operating system components 878 comprise portions of an operating system, which portions are interfaced with or included in the runnable instance and/or any user containerized functions. In some embodiments of a daemon-assisted containerized architecture, computing platform 806 might or might not host operating system components other than operating system components 878. More specifically, the shown daemon might or might not host operating system components other than operating system components 878 of user executable container instance 870.

In some embodiments, the virtualization system architecture 8A00, 8B00, and/or 8C00 can be used in any combination to implement a distributed platform that contains multiple servers and/or nodes that manage multiple tiers of storage where the tiers of storage might be formed using the shown data repository 831 and/or any forms of network accessible storage. As such, the multiple tiers of storage may include storage that is accessible over communications link 815. Such network accessible storage may include cloud storage or networked storage (e.g., a SAN or storage area network). Unlike prior approaches, the disclosed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In some embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

In some embodiments, any one or more of the aforementioned virtual disks can be structured from any one or more of the storage devices in the storage pool. In some embodiments, a virtual disk is a storage abstraction that is exposed by a controller virtual machine or container to be used by another virtual machine or container. In some embodiments, the virtual disk is exposed by operation of a storage protocol such as iSCSI or NFS or SMB. In some embodiments, a virtual disk is mountable. In some embodiments, a virtual disk is mounted as a virtual storage device.

In some embodiments, some or all of the servers or nodes run virtualization software. Such virtualization software might include a hypervisor (e.g., as shown in configuration 851) to manage the interactions between the underlying hardware and user virtual machines or containers that run client software.

Distinct from user virtual machines or user executable containers, a special controller virtual machine (e.g., as depicted by controller virtual machine instance 830) or as a special controller executable container is used to manage certain storage and I/O activities. Such a special controller virtual machine is sometimes referred to as a controller executable container, a service virtual machine (SVM), a service executable container, or a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines-above the hypervisors-thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 1D:
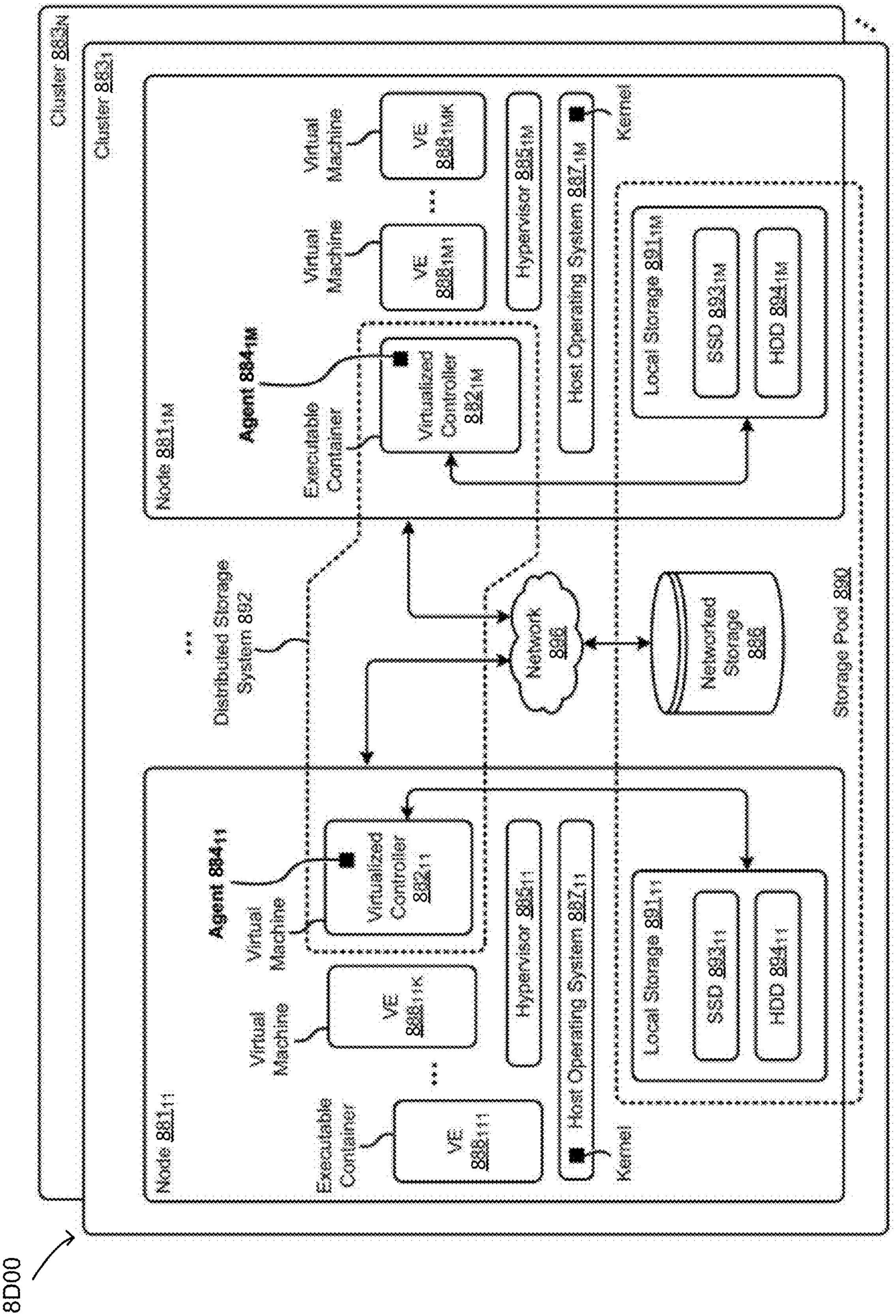

FIG. 1D is a block diagram illustrating virtualization system architecture 8D00 configured to implement one or more aspects of the present embodiments. As shown in FIG. 1D, virtualization system architecture 8D00 includes a distributed virtualization system that includes multiple clusters (e.g., cluster $\mathbf{883}_1$, . . . , cluster $\mathbf{883}_N$) comprising multiple nodes that have multiple tiers of storage in a storage pool. Representative nodes (e.g., node $\mathbf{881}_{11}$, . . . , node $\mathbf{881}_{1M}$) and storage pool 890 associated with cluster $\mathbf{883}_1$ are shown. Each node can be associated with one server, multiple servers, or portions of a server. The nodes can be associated (e.g., logically and/or physically) with the clusters. As shown, the multiple tiers of storage include storage that is accessible through a network 896, such as a networked storage 886 (e.g., a storage area network or SAN, network attached storage or NAS, etc.). The multiple tiers of storage further include instances of local storage (e.g., local storage $\mathbf{891}_{11}$, . . . , local storage $\mathbf{891}_{1M}$). For example, the local storage can be within or directly attached to a server and/or appliance associated with the nodes. Such local storage can include solid state drives (SSD $\mathbf{893}_{11}$, . . . , SSD $\mathbf{893}_{1M}$), hard disk drives (HDD $\mathbf{894}_{11}$, . . . , HDD $\mathbf{894}_{1M}$), and/or other storage devices.

As shown, any of the nodes of the distributed virtualization system can implement one or more user virtualized entities (e.g., VE $\mathbf{8881}_{11}$, . . . , VE $\mathbf{8881}_{1K}$, . . . , VE $\mathbf{888}_{1M1}$, . . . , VE $\mathbf{888}_{1MK}$), such as virtual machines (VMs) and/or executable containers. The VMs can be characterized as software-based computing "machines" implemented in a container-based or hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $\mathbf{887}_{11}$, . . . , host operating system $\mathbf{887}_{1M}$), while the VMs run multiple applications on various respective guest operating systems. Such flexibility can be facilitated at least in part by a hypervisor (e.g., hypervisor $\mathbf{885}_{11}$, . . . , hypervisor $\mathbf{885}_{1M}$), which hypervisor is logically located between the various guest operating systems of the VMs and the host operating system of the physical infrastructure (e.g., node).

As an alternative, executable containers may be implemented at the nodes in an operating system-based virtualization environment or in a containerized virtualization environment. The executable containers are implemented at the nodes in an operating system virtualization environment or container virtualization environment. The executable containers can include groups of processes and/or resources (e.g., memory, CPU, disk, etc.) that are isolated from the node host computer and other containers. Such executable containers directly interface with the kernel of the host operating system (e.g., host operating system $\mathbf{887}_{11}$, . . . , host operating system $\mathbf{887}_{1M}$) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 890 by the VMs and/or the executable containers.

Multiple instances of such virtualized controllers can coordinate within a cluster to form the distributed storage system 892 which can, among other operations, manage the storage pool 890. This architecture further facilitates efficient scaling in multiple dimensions (e.g., in a dimension of computing power, in a dimension of storage space, in a dimension of network bandwidth, etc.).

In some embodiments, a particularly configured instance of a virtual machine at a given node can be used as a virtualized controller in a hypervisor-assisted virtualization environment to manage storage and I/O (input/output or IO) activities of any number or form of virtualized entities. For example, the virtualized entities at node $\mathbf{881}_{11}$ can interface with a controller virtual machine (e.g., virtualized controller $\mathbf{882}_{11}$) through hypervisor $\mathbf{885}_{11}$ to access data of storage pool 890. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 892. For example, a hypervisor at one node in the distributed storage system 892 might correspond to software from a first vendor, and a hypervisor at another node in the distributed storage system 892 might correspond to a second software vendor. As another virtualized controller implementation example, executable containers can be used to implement a virtualized controller (e.g., virtualized controller $\mathbf{882}_{1M}$) in an operating system virtualization environment at a given node. In this case, for example, the virtualized entities at node $\mathbf{881}_{1M}$ can access the storage pool 890 by interfacing with a controller container (e.g., virtualized controller $\mathbf{882}_{1M}$) through hypervisor $\mathbf{885}_{1M}$ and/or the kernel of host operating system $\mathbf{887}_{1M}$.

In some embodiments, one or more instances of an agent can be implemented in the distributed storage system 892 to facilitate the herein disclosed techniques. Specifically, agent $\mathbf{884}_{11}$ can be implemented in the virtualized controller $\mathbf{882}_{11}$, and agent $\mathbf{884}_{1M}$ can be implemented in the virtualized controller $\mathbf{882}_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

Exemplary Computer System

Figure 2:
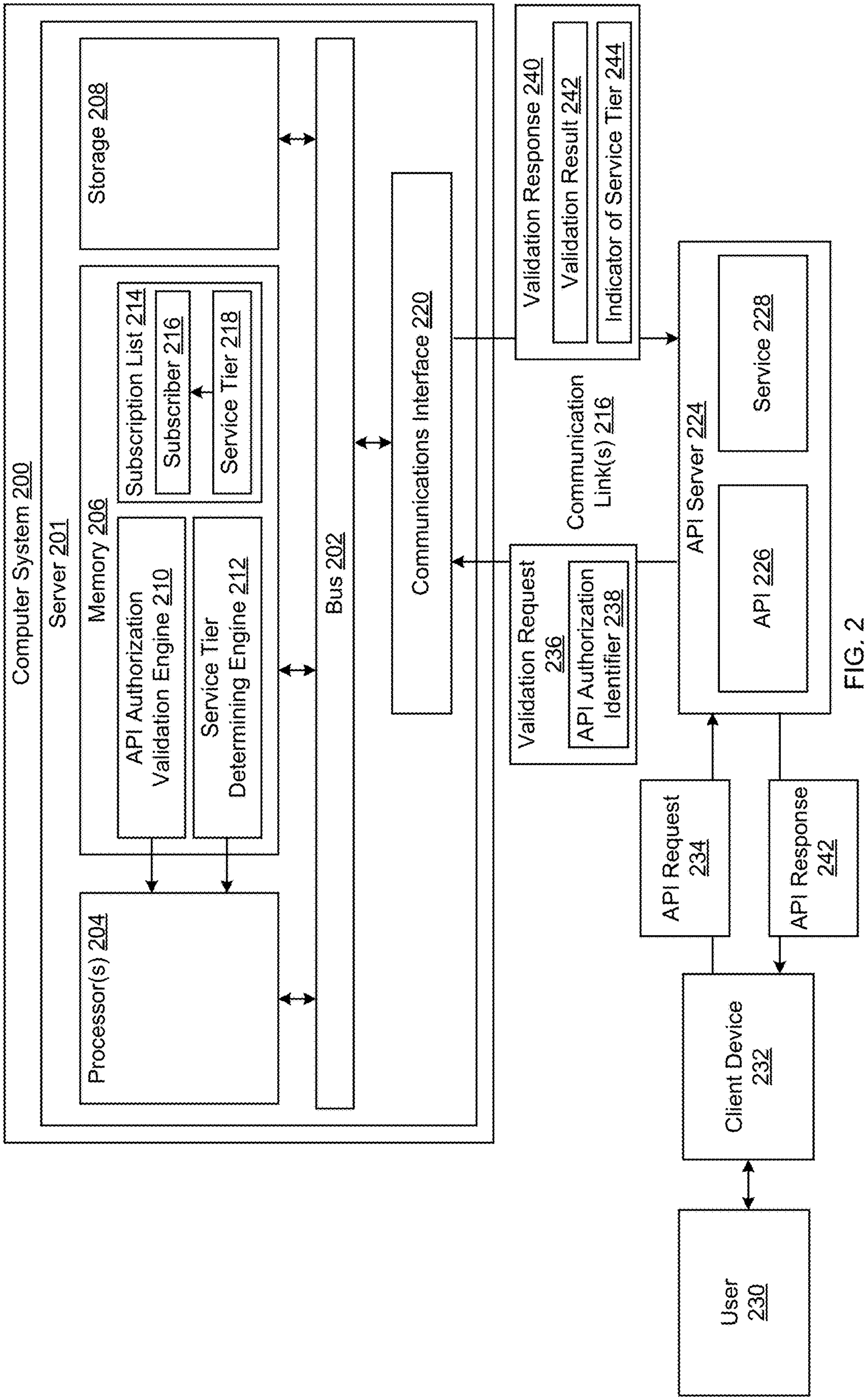
FIG. 2 is a block diagram illustrating a computer system configured to implement one or more aspects of the present embodiments.

FIG. 2 is a block diagram illustrating a computer system 200 configured to implement one or more aspects of the present embodiments. As shown, a server 201 within the computer system 200 includes, without limitation, a bus 202, one or more processors 204, a memory 206, storage 208, and a communications interface 220. The memory 206 includes an API authorization validation engine 210, a service tier determining engine 212, and a subscription list 214. One or more of the servers 201 of FIG. 2 can be included any of the virtualization system architectures shown in FIGS. 1A-1D.

The one or more processors 204 include any suitable processors implemented as a central processing unit (CPU), a graphics processing unit (GPU), an application-specific integrated circuit (ASIC), a field programmable gate array (FPGA), an artificial intelligence (AI) accelerator, any other type of processor, or a combination of different processors, such as a CPU configured to operate in conjunction with a GPU. In general, the one or more processors 204 can be any technically feasible hardware unit capable of processing data and/or executing software applications.

Memory 206 includes a random-access memory (RAM) module, a flash memory unit, and/or any other type of memory unit or combination thereof. The one or more processors 204 and/or communications interface 220 are configured to read data from and write data to memory 206. Memory 206 includes various software programs that include one or more instructions that can be executed by the one or more processors 204 and application data associated with said software programs.

Storage 208 includes non-volatile storage for applications and data, and may include one or more fixed or removable disk drives, HDDs, SSD, NVMes, vDisks, flash memory devices, and/or other magnetic, optical, and/or solid-state storage devices.

The bus 202 interconnects subsystems and devices, such as the one or more processors 204, memory 206, storage 208, and communications interface 220. The computer system 200 described herein is illustrative and any other technically feasible configurations fall within the scope of the present disclosure. Further, in the context of this disclosure, the computing elements shown in the computer system 200 can correspond to a physical computing system (e.g., a system in a data center) or can include a virtual computing instance.

Communications interface 220 includes hardware and/or software for coupling the computer system 200 to an API server 224 by one or more communication links 216. The one or more communication links 216 can include any technically feasible type of communications network that allows data to be exchanged between the computer system 200 and the API server 224, as well as other external entities or devices (e.g., a webserver, an email server, another networked computing system, and/or the like). For example, the one or more communication links 216 can include one or more wide area networks (WANs), one or more local area networks (LANs), one or more wireless (WiFi) networks, the Internet, and/or the like.

The computer system 200 is configured to communicate with an API server 224 that provides a service 228 through an API 226. The service 228 can include, for example, an information service that provides various types of information (e.g., news, weather forecasts, events arising within an infrastructure, and/or the like), an infrastructure monitoring service that monitors the performance of an infrastructure, a communication service that exchanges communication messages among one or more parties, and/or the like. The API 226 can include, for example, a set of callable functions, where the functions perform various operations of the service 228 on behalf of one or more users 230 and/or client devices 232. The API 226 defines a protocol that specifies a format of API requests 234 for operations to be performed by the service 228 and/or API responses 242 generated in response to such API requests 234. One or more API servers 224 of FIG. 2 can be included in any of the virtualization system architectures shown in FIGS. 1A-1D.

The API server 224 receives an API request 234 to perform an operation involving the service 228. In various embodiments, the operation includes a request to retrieve information from the service 228, a request to store or change data stored by the service 228, a request to cause the API server 224 to transmit information to another server or device, and/or the like. The client device 232 transmits the API request 234 to the API server 224 on behalf of a user 230, such as a user of a graphical user interface (GUI) of the client device 232. The API request 234 is formatted as indicated by the API 226 (e.g., according to a data format, such as a variant of an extensible Markup Language (XML), JavaScript Object Notation (JSON), and/or the like). In various embodiments, the API server 224 performs initial validation of the API request 234 (e.g., verifying that the API request 234 is formatted as indicated by the API 226).

The API server 224 transmits a validation request 236 to the server 201 via the one or more communication links 216. The validation request 236 transmitted by the API server 224 includes an API authorization identifier 238. In various embodiments, the API authorization identifier 238 includes a key, a token, a certificate, and/or the like. In various embodiments, the API server 224 stores the API authorization identifier 238 and adds the API authorization identifier 238 to the API request 234 received from the client device 232. Additionally or alternatively, the API server 224 receives the API authorization identifier 238 in the API request 234 received from the client device 232. In various embodiments, the API authorization identifier 238 identifies the API server 224 (e.g., a regional API server 224 in a set of API servers providing a globalized service 228, such as a weather service). In various embodiments, the API authorization identifier 238 identifies the service 228 (e.g., a first service 228 provided by an API server 224 that also provides one or more additional services, wherein the API request 234 indicates the first service 228 instead of one of the one or more additional services). In various embodiments, the API authorization identifier 238 is included in a header of the validation request 236, or as part of a URL associated with the API request 234 and/or the validation request 236. For example, the URL associated with the API 226 (e.g., a URL called by the client device 232 to initiate the API request 234) includes a first portion that identifies the API server 224 and/or the service 228 and a second portion that identifies the user 230 and/or client device 232, such as a tenant ID.

The server 201 receives the validation request 236 via the communications interface 220. The server 201 validates the API authorization identifier 238 included in the validation request 236. As shown, the API authorization validation engine 210 is a program stored in the memory 206 and executed by the one or more processors 204 to validate the API authorization identifier 238 received in the validation request 236. In various embodiments, the API authorization validation engine 210 validates the API authorization identifier 238 by comparing an identifier of the API server 224 included in the validation request 236 with a stored cryptographic certificate that identifies the API server 224. In various embodiments, the API authorization validation engine 210 validates the API authorization identifier 238 by validating a cryptographic signature of an authorization identifier included in the validation request 236, where the authorization identifier indicates that the user 230 and/or the client device 232 is permitted to access the API 226 and/or the service 228. In various embodiments, the API authorization validation engine 210 validates the API authorization identifier 238 by validating an identity of the user 230 and/or the client device 232, where the identity is indicated by an identifier that is included in the validation request 236. Based on the validation of the API authorization identifier 238, the API authorization validation engine 210 generates a validation result 242 that indicates a result of the API authorization validation. In various embodiments, the validation result 242 includes either an indication that the user 230 and/or client device 232 is permitted to access the API 226 and/or the service 228 or an indication that the user 230 and/or client device 232 is not permitted to access the API 226 and/or the service 228. In various embodiments, the validation result 242 includes either an indication that an identity of the API server 224, the user 230, and/or the client device 232 was verified and/or an indication that an identity of the API server 224, the user 230, and/or the client device 232 was not verified. That is, the validation result 242 indicates whether or not the API request 234 should be fulfilled or denied, irrespective of a service tier of the user 230 and/or client device 232. In various embodiments, the validation result 242 includes either an API authorization validation success (e.g., an indication that the API authorization identifier was validated) or an API authorization validation failure (e.g., an indication that the API authorization identifier was not validated).

The server 201 determines a service tier 218 based on the API request 234. As shown, the service tier determining engine 212 is a program stored in the memory 206 and executed by the one or more processors 204 to determine service tiers 218 based on various API requests 234. As shown, the service tier determining engine 212 determines the service tier 218 based on the validation request 236 based on a subscription list 214. The subscription list 214 associates one or more subscribers 216 with one or more service tiers 218. In various embodiments, the one or more subscribers 216 indicated by the subscription list 214 include an identifier of one or more users 230 and/or an identifier of one or more client devices 232. Each subscriber 216 is associated with a service tier 218, such as (without limitation) a free service tier 218, a first subscription service tier 218 associated with a first configuration of the service 228, a second subscription service tier 218 associated with a second configuration of the service 228, and/or the like. Based on the determination of the service tier 218 for the API request 234, the service tier determining engine 212 generates an indicator of service tier 244 that indicates the determined service tier 218. In various embodiments, the indicator of service tier 244 indicates a performance of the service 228 by the API server 224 based on the service tier 218. The performance of the service 228 can include, for example (without limitation), an availability of an operation of the service 228 based on the service tier 218, a level of detail of an operation of the service 228 based on the service tier 218, a resource limit of resources that can be expended by the API 226 while performing the service 228 based on the service tier 218, and/or the like.

In various embodiments, the service tier determining engine 212 determines the service tier 218 based on identifying information included in the API request 234 that identifies at least one of the user 230 associated with the request or the client device 232 associated with the request. For example, the service tier 218 is determined based on a subscription list 214 indicating a subscription that includes the service 228 provided by the API server 224 and a second service provided by another API server. The subscription list 214 associates a service tier 218 of the service 228 with each subscriber of a plurality of subscribers.

In various embodiments, the service tier determining engine 212 determines the service tier 218 as a default service tier in response to a failure to determine a service tier 218 based on the validation request 236. For example, if the user 230 and/or client device 232 associated with an API request 234 are not included in a subscription list 214, the service tier determining engine 212 instead determines a default service tier 218 for the API server 224 to use while performing the service 228 in response to the API request 234.

In various embodiments, the indicator of service tier 244 includes an indicator of a subscription that associates the service 228 with the user 230 and/or the client device 232 associated with the API request 234. Additionally or alternatively, in various embodiments, the indicator of service tier 244 includes an identifier of the user 230 and/or the client device 232 associated with the service tier 228.

The server 201 generates a validation response 240 based on the validation request 236 received from the API server 224. The validation response 240 includes the validation result 242 generated by the API authorization validation engine 210 and the indicator of service tier 244 generated by the service tier determining engine 212. The communications interface 220 of the server 201 transmits the validation response 240 to the API server 224 by the one or more communication links 216. Based on the validation result 242 and the indicator of service tier 244 included in the validation response 240, the API server 224 determines whether or not to perform one or more operations of the service 228 indicated in the API request 234 and/or a manner in which one or more operations of the service 228 are to be performed. The API server 224 generates an API response 242 based on the operations performed (or not performed) by the service 228 in response to the API request 234 received from the client device 232. The API server 224 transmits the API response 242 to the client device 232 to fulfill the API request 234.

Figure 3:
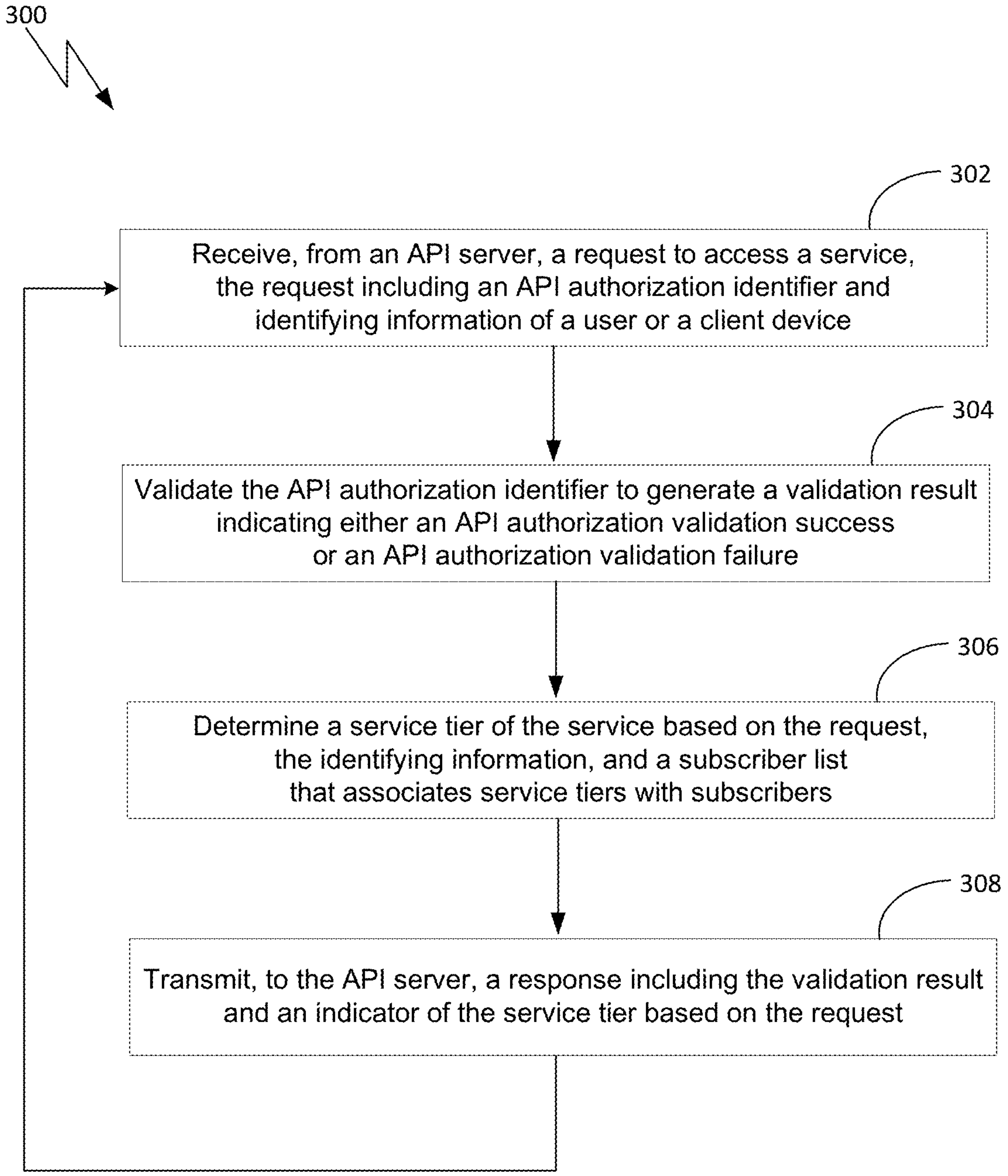
FIG. 3 illustrates a flow diagram of method steps for configuring a computer system to validate requests to access services, according to various embodiments.

FIG. 3 illustrates a flow diagram of method steps for configuring a computer system to validate requests to access services, according to various embodiments. Although the method steps are described in conjunction with the systems of FIGS. 1A-2, persons skilled in the art will understand that any system configured to perform the method steps, in any order, is within the scope of the present disclosure. The method steps can be performed, for example, by the virtualization system architectures of FIGS. 1A-1D. Additionally or alternatively, the method steps can be performed by the API authorization validation engine 210 and/or the service tier determining engine 212 of the computer system 200 of FIG. 2.

As shown, a method 300 begins at step 302 in which an API authorization validation engine receives, from an API server, a request to access a service, where the request includes an API authorization identifier. In various embodiments, the request includes the validation request 236 of FIG. 2. In various embodiments, the request includes a request to invoke a function of an API provided by the API server. In various embodiments, the request further includes identifying information of a user or a client device. In various embodiments, the request is initiated either directly by the client device or by the user through a user interface of the client device.

At step 304, the API authorization validation engine validates the API authorization identifier to generate a validation result. In various embodiments, the validation result indicates either an API authorization validation success (e.g., an indication that the API authorization identifier is valid and that the requested service should be performed) or an API authorization validation failure (e.g., an indication that the API authorization identifier is not valid and that the requested service should not be performed).

At step 306, the service tier determining engine determines a service tier of the service based on the request. In various embodiments, the service tier determining engine determines the service tier based on the identifying information of the user or client device included in the request. In various embodiments, the service tier determining engine determines the service tier based on a subscriber list that associates service tiers with subscribers.

At step 308, the service tier determining engine transmits, to the API server, a response including the validation result and an indicator of the service tier based on the request. In various embodiments, the response includes the validation response 240 of FIG. 2. In various embodiments, the response includes the validation result 242 of FIG. 2 and/or the indicator of service tier 244 of FIG. 2. In various embodiments, the indicator indicates various properties of the service to be performed by the API server, such as a usage quota or a number of search results returned by a search engine. In various embodiments, the validation result indicates to the API server whether the service should be performed based on the validation of the API authorization identifier. In various embodiments, the indicator of the service tier indicates to the API server the manner in which the API server should perform the service in response to the request. The method 300 returns to step 302 to receive additional requests from the same API server and/or other API servers.

Figure 4:
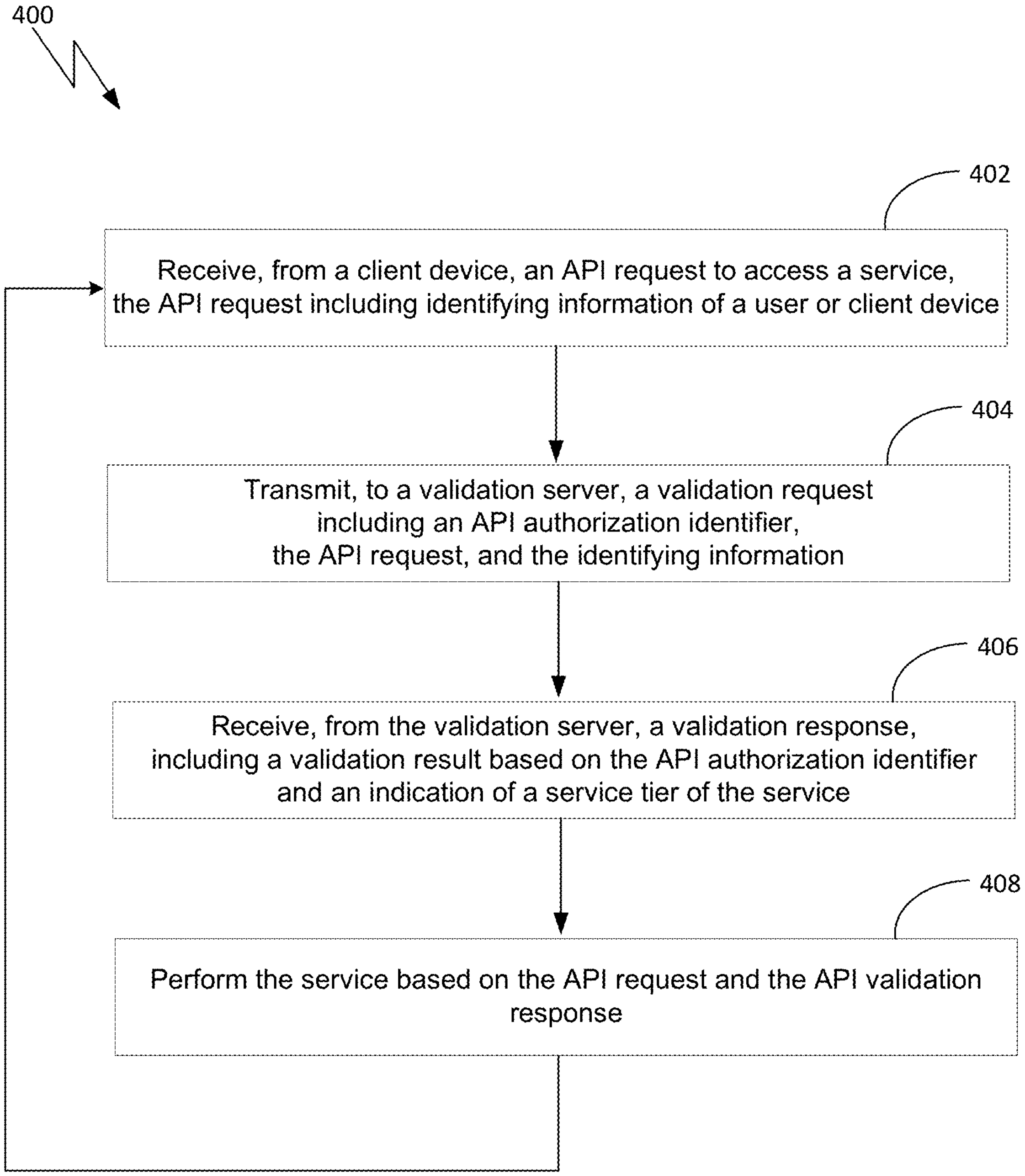
FIG. 4 illustrates a flow diagram of method steps for configuring a computer system to fulfill requests, according to various embodiments.

FIG. 4 illustrates a flow diagram of method steps for configuring a computer system to fulfill requests access services, according to various embodiments. Although the method steps are described in conjunction with the systems of FIGS. 1A-2, persons skilled in the art will understand that any system configured to perform the method steps, in any order, is within the scope of the present disclosure. The method steps can be performed, for example, by the virtualization system architectures of FIGS. 1A-1D. Additionally or alternatively, the method steps can be performed by the API server 224 of FIG. 2.

As shown, a method 400 begins at step 402 and includes receiving, from a client device, an API request to access a service. In various embodiments, the API request includes a request to invoke a function of an API provided by the API server. In various embodiments, the API request includes identifying information of a user or the client device.

At step 404, the API server transmits, to a validation server, a validation request including an API authorization identifier. In various embodiments, the request includes the validation request 236 of FIG. 2. In various embodiments, the API authorization identifier is received with the request from the user, or is stored by the API server and is associated with the request. In various embodiments, the API server also transmits identifying information of the user or the client device to the validation server.

At step 406, the API server receives, from the validation server, an API validation response that includes a validation result based on the API authorization identifier and an indicator of a service tier of the service based on the request. In various embodiments, the response includes the validation response 240 of FIG. 2. In various embodiments, the response includes the validation result 242 of FIG. 2 and/or the indicator of service tier 244 of FIG. 2. In various embodiments, the validation result indicates either an API validation success (e.g., an indication that the API authorization identifier is valid and that the requested service should be performed) or an API authorization validation failure (e.g., an indication that the API authorization identifier is not valid and that the requested service should not be performed). In various embodiments, the indicator of the service tier is based on the identifying information provided by the API server to the validation server. In various embodiments, the indicator of the service tier indicates a manner in which the API server should perform the service in response to the API request.

At step 408, the API server performs the service based on the API request and the validation response. In various embodiments, the API server performs the service based on the indicator of a determined service tier, such as the indicator of service tier 244 of FIG. 2. In various embodiments, the service tier 218 indicates various properties of the service to be performed by the API server, such as a usage quota, a number of search results returned by a search engine, and/or the like. In various embodiments, the API server transmits, to the client device, an API response indicating a result of performing the service in response to the API request. The method 400 returns to step 402 to receive additional API requests to perform additional services on behalf of the same user or client device and/or other users or client devices.

In sum, techniques are disclosed for configuring a validation server to validate requests to access services. The techniques include receiving, from an API server, a request to access a service, the request including an API authorization identifier. The techniques include validating the API authorization identifier. Validating the API authorization identifier causes the validation server to generate a validation result. The techniques include determining a service tier of the service based on the request. Determining the service tier causes the validation server to generate an indicator of a service tier. The techniques include transmitting, to the API server, a response including the validation result and an indicator of the service tier based on the request. Transmitting the response to the API server enables the API server to provide the service based on the indicator of the service tier, in addition to the validation result of validating the API authorization identifier.

At least one technical advantage of the disclosed techniques relative to the prior art is that, with the disclosed techniques, an API server is able to better manage computing resources for responding to API requests by taking into account the service tiers associated with each of the API requests. Another technical advantage is that, with the disclosed techniques, there is increased efficiency in determining the service tier to provide a response to an API request by reducing the time and computing resources used to determine the service tier. The increased efficiency therefore improves the scalability of the API server to handle a higher volume of API requests and the speed with which the API server responds to an API request. These technical advantages provide one or more technological improvements over prior art approaches.

1. In some embodiments, one or more non-transitory computer-readable media store program instructions that, when executed by one or more processors, cause the one or more processors to perform a method comprising: receiving, from an application programming interface (API) server, a request to access a service, the request including an API authorization identifier; validating the API authorization identifier to generate a validation result; determining a service tier of the service based on the request; and transmitting, to the API server, a response including the validation result and an indicator of the service tier based on the request.

2. The one or more non-transitory computer-readable media according to clause 1, wherein the API authorization identifier includes at least one of a key, a token, or a certificate.

3. The one or more non-transitory computer-readable media according to clause 1 or clause 2, wherein the indicator of the service tier indicates a level of performance to be used by the API server in performing the service.

4. The one or more non-transitory computer-readable media according to any of clauses 1-3, wherein the service tier is determined based on identifying information of a user or a client device.

5. The one or more non-transitory computer-readable media according to any of clauses 1-4, wherein the service tier is determined based on a subscription of a user or a client device that includes the service provided by the API server.

6. The one or more non-transitory computer-readable media according to any of clauses 1-5, wherein the service tier is determined based on a subscription list that associates service tiers with subscribers.

7. The one or more non-transitory computer-readable media according to any of clauses 1-6, further comprising determining a default service tier in response to a failure to determine a service tier based on the request.

8. The one or more non-transitory computer-readable media according to any of clauses 1-7, wherein the indicator of the service tier includes a subscription associated with at least one of a user associated with the request or a client device associated with the request.

9. The one or more non-transitory computer-readable media according to any of clauses 1-8, wherein the service tier indicates a performance of the service by the API server based on one or more of, an availability of an operation of the service based on the service tier, a level of detail of an operation of the service based on the service tier, or a resource limit of resources used by an operation of the service based on the service tier.

10. In some embodiments, a computer-implemented method of validating requests to access services comprises: receiving, from an application programming interface (API) server, a request to access a service, the request including an API authorization identifier; validating the API authorization identifier to generate a validation result; determining a service tier of the service based on the request; and transmitting, to the API server, a response including the validation result and an indicator of the service tier based on the request.

11. The computer-implemented method according to clause 10, wherein the API authorization identifier includes at least one of a key, a token, or a certificate.

12. The computer-implemented method according to clause 10 or clause 11, wherein the indicator of the service tier indicates a level of performance to be used by the API server in performing the service.

13. The computer-implemented method according to any of clauses 10-12, wherein the service tier is determined based on identifying information of a user or a client device.

14. The computer-implemented method according to any of clauses 10-13, wherein the service tier is determined based on a subscription of a user or a client device that includes the service provided by the API server.

15. The computer-implemented method according to any of clauses 10-14, wherein the service tier is determined based on a subscription list that associates service tiers with subscribers.

16. The computer-implemented method according to any of clauses 10-15, further comprising determining a default service tier in response to a failure to determine a service tier based on the request.

17. The computer-implemented method according to any of clauses 10-16, wherein the indicator of the service tier includes a subscription associated with at least one of a user associated with the request or a client device associated with the request.

18. The computer-implemented method according to any of clauses 10-17, wherein the service tier indicates a performance of the service by the API server based on one or more of, an availability of an operation of the service based on the service tier, a level of detail of an operation of the service based on the service tier, or a resource limit of resources used by an operation of the service based on the service tier.

19. In some embodiments, a system comprises: a memory that stores instructions, and a processor that is coupled to the memory and, when executing the instructions, is configured to: receive, from an application programming interface (API) server, a request to access a service, the request including an API authorization identifier; validate the API authorization identifier to generate a validation result; determine a service tier of the service based on the request; and transmit, to the API server, a response including the validation result and an indicator of the service tier based on the request.

20. The system according to clause 19, wherein the API authorization identifier includes at least one of a key, a token, or a certificate.

21. The system according to clause 19 or clause 20, wherein the indicator of the service tier indicates a level of performance to be used by the API server in performing the service.

22. The system according to any of clauses 19-21, wherein the service tier is determined based on identifying information of a user or a client device.

23. The system according to any of clauses 19-22, wherein the service tier is determined based on a subscription of a user or a client device that includes the service provided by the API server.

24. The system according to any of clauses 19-23, wherein the service tier is determined based on a subscription list that associates service tiers with subscribers.

25. The system according to any of clauses 19-24, wherein the processor, when executing the instructions, is further configured to determine a default service tier in response to a failure to determine a service tier based on the request.

26. The system according to any of clauses 19-25, wherein the indicator of the service tier includes a subscription associated with at least one of a user associated with the request or a client device associated with the request.

27. The system according to any of clauses 19-26, wherein the service tier indicates a performance of the service by the API server based on one or more of, an availability of an operation of the service based on the service tier, a level of detail of an operation of the service based on the service tier, or a resource limit of resources used by an operation of the service based on the service tier.

28. In some embodiments, one or more non-transitory computer-readable media store program instructions that, when executed by one or more processors, cause the one or more processors to perform a method comprising: receiving, from a client device, a request to access a service; transmitting, to a validation server, an application programming interface (API) request including an API authorization identifier; receiving, from the validation server, an API validation response, the API validation response including a validation result based on the API authorization identifier and an indicator of a service tier of the service based on the request; and performing the service based on the API request and the API validation response.

29. The one or more non-transitory computer-readable media according to clause 28, wherein the indicator of the service tier indicates a level of performance to be used by an API server in performing the service.

30. The one or more non-transitory computer-readable media according to clause 28 or clause 29, wherein the service tier is determined based on identifying information of a user or a client device.

31. The one or more non-transitory computer-readable media according to any of clauses 28-30, wherein the service tier is determined based on a subscription of a user or a client device that includes the service.

32. The one or more non-transitory computer-readable media according to any of clauses 28-31, wherein the service tier is determined based on a subscription list that associates service tiers with subscribers.

33. The one or more non-transitory computer-readable media according to any of clauses 28-32, further comprising determining a default service tier in response to a failure to determine a service tier based on the request.

34. The one or more non-transitory computer-readable media according to any of clauses 28-33, wherein the indicator of the service tier includes a subscription associated with at least one of a user associated with the request or a client device associated with the request.

35. The one or more non-transitory computer-readable media according to any of clauses 28-34, wherein the service tier indicates a performance of the service by an API server based on one or more of, an availability of an operation of the service based on the service tier, a level of detail of an operation of the service based on the service tier, or a resource limit of resources used by an operation of the service based on the service tier.

36. In some embodiments, a computer-implemented method of fulfilling requests to access services comprises: receiving, from a client device, a request to access a service; transmitting, to a validation server, an application programming interface (API) request including an API authorization identifier; receiving, from the validation server, an API validation response, the API validation response including a validation result based on the API authorization identifier and an indicator of a service tier of the service based on the request; and performing the service based on the API request and the API validation response.

37. The computer-implemented method according to clause 36, wherein the indicator of the service tier indicates a level of performance to be used by an API server in performing the service.

38. The computer-implemented method according to clause 36 or clause 37, wherein the service tier is determined based on identifying information of a user or a client device.

39. The computer-implemented method according to any of clauses 36-38, wherein the service tier is determined based on a subscription of a user or a client device that includes the service.

40. The computer-implemented method according to any of clauses 36-39, wherein the service tier is determined based on a subscription list that associates service tiers with subscribers.

41. The computer-implemented method according to any of clauses 36-40, further comprising determining a default service tier in response to a failure to determine a service tier based on the request.

42. The computer-implemented method according to any of clauses 36-40, wherein the indicator of the service tier includes a subscription associated with at least one of a user associated with the request or a client device associated with the request.

43. The computer-implemented method according to any of clauses 36-42, wherein the service tier indicates a performance of the service by an API server based on one or more of, an availability of an operation of the service based on the service tier, a level of detail of an operation of the service based on the service tier, or a resource limit of resources used by an operation of the service based on the service tier.

44. In some embodiments, a system comprises: a memory that stores instructions, and a processor that is coupled to the memory and, when executing the instructions, is configured to: receive, from a client device, a request to access a service; transmit, to a validation server, an application programming interface (API) request including an API authorization identifier; receive, from the validation server, an API validation response, the API validation response including a validation result based on the API authorization identifier and an indicator of a service tier of the service based on the request; and perform the service based on the API request and the API validation response.

45. The system according to clause 44, wherein the indicator of the service tier indicates a level of performance to be used by an API server in performing the service.

46. The system according to clause 44 or clause 45, wherein the service tier is determined based on identifying information of a user or a client device.

47. The system according to any of clauses 44-46, wherein the service tier is determined based on a subscription of a user or a client device that includes the service.

48. The system according to any of clauses 44-47, wherein the service tier is determined based on a subscription list that associates service tiers with subscribers.

49. The system according to any of clauses 44-48, wherein the processor, when executing the instructions, is further configured to determine a default service tier in response to a failure to determine a service tier based on the request.

50. The system according to any of clauses 44-49, wherein the indicator of the service tier includes a subscription associated with at least one of a user associated with the request or a client device associated with the request.

51. The system according to any of clauses 44-50, wherein the service tier indicates a performance of the service by an API server based on one or more of, an availability of an operation of the service based on the service tier, a level of detail of an operation of the service based on the service tier, or a resource limit of resources used by an operation of the service based on the service tier.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a “module,” a “system,” or a “computer.” In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. One or more non-transitory computer-readable media store program instructions that, when executed by one or more processors of an application programming interface (API) server, cause the one or more processors to perform a method comprising:

receiving, from a client device, a request to access a service;

transmitting, to a validation server, an authorization request including an API authorization identifier;

receiving, from the validation server, a validation response to the authorization request, the validation response including a validation result based on the API authorization identifier and an indicator of a level of resources to be used when performing the request; and performing the service based on the request and the validation response.

2. The one or more non-transitory computer-readable media of claim 1, wherein performing the service comprises performing the service without exceeding a usage quota or a resource limit indicated by the level of resources.

3. The one or more non-transitory computer-readable media of claim 1, wherein the level of resources indicates a level of performance to be used by the API server when performing the service.

4. The one or more non-transitory computer-readable media of claim 1, wherein the level of resources indicates availability of one or more operations when performing the service.

5. The one or more non-transitory computer-readable media of claim 1, wherein the level of resources is determined based on identifying information of the client device or identifying information of a user of the client device.

6. The one or more non-transitory computer-readable media of claim 1, wherein the level of resources is determined based on a subscription of the client device or a subscription of a user of the client device.

7. The one or more non-transitory computer-readable media of claim 1, wherein the level of resources indicates whether the client device or a user of the client device has a paid subscription or a free subscription to the service.

8. The one or more non-transitory computer-readable media of claim 1, wherein the level of resources is determined based on a service tier associated with the client device or a service tier associated with a user of the client device.

9. The one or more non-transitory computer-readable media of claim 1, wherein the level of resources is a default level of resources when the level of resources cannot be determined based on the request.

10. A computer-implemented method of fulfilling requests to access services, the computer-implemented method comprising:

receiving, by an application programming interface (API) server from a client device, a request to access a service;

transmitting, by the API server to a validation server, an authorization request including an API authorization identifier;

receiving, by the API server from the validation server, a validation response to the authorization request, the validation response including a validation result based on the API authorization identifier and an indicator of a level of resources to be used when performing the request; and performing, by the API server, the service based on the request and the validation response.

11. The computer-implemented method of claim 10, wherein performing the service comprises performing the service without exceeding a usage quota or a resource limit indicated by the level of resources.

12. The computer-implemented method of claim 10, wherein the level of resources indicates a level of performance to be used by the API server when performing the service.

13. The computer-implemented method of claim 10, wherein the level of resources indicates availability of one or more operations when performing the service.

14. The computer-implemented method of claim 10, wherein the level of resources is determined based on identifying information of the client device or identifying information of a user of the client device.

15. The computer-implemented method of claim 10, wherein the level of resources is determined based on a subscription of the client device or a subscription of a user of the client device.

16. The computer-implemented method of claim 10, wherein the level of resources indicates whether the client device or a user of the client device has a paid subscription or a free subscription to the service.

17. The computer-implemented method of claim 10, wherein the level of resources is determined based on a service tier associated with the client device or a service tier associated with a user of the client device.

18. The computer-implemented method of claim 10, wherein the level of resources is a default level of resources when the level of resources cannot be determined based on the request.

19. An application programming interface (API) server, the server comprising:

a memory that stores instructions; and one or more processors that are coupled to the memory and, when executing the instructions, are configured to:

receive, from a client device, a request to access a service;

transmit, to a validation server, an authorization request including an API authorization identifier;

receive, from the validation server, a validation response to the authorization request, the validation response including a validation result based on the API authorization identifier and an indicator of a level of resources to be used when performing the request; and perform the service based on the request and the validation response.

20. The server of claim 19, wherein to perform the service, the one or more processors perform the service without exceeding a usage quota or a resource limit indicated by the level of resources.

21. The server of claim 19, wherein the level of resources indicates a level of performance to be used by the API server when performing the service.

22. The server of claim 19, wherein the level of resources indicates availability of one or more operations when performing the service.

23. The server of claim 19, wherein the level of resources is determined based on identifying information of the client device or identifying information of a user of the client device.

24. The server of claim 19, wherein the level of resources is determined based on a subscription of the client device or a subscription of a user of the client device.

25. The server of claim 19, wherein the level of resources indicates whether the client device or a user of the client device has a paid subscription or a free subscription to the service.

26. The server of claim 19, wherein the level of resources is determined based on a service tier associated with the client device or a service tier associated with a user of the client device.

27. The server of claim 19, wherein the level of resources is a default level of resources when the level of resources cannot be determined based on the request.

* * * * *